R. R. LOCKHART.
ELECTRICAL WATER HEATER.
APPLICATION FILED MAY 28, 1913.
1,093,195.
Patented Apr. 14, 1914.
2 SHEETS—SHEET 1.
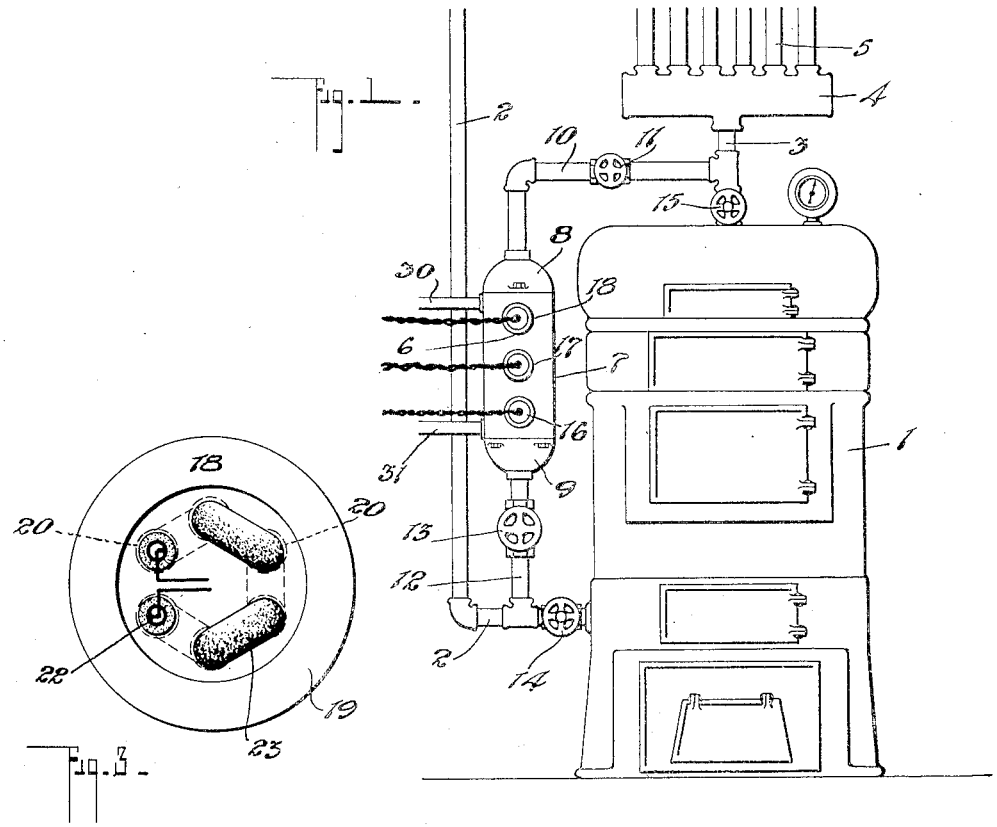
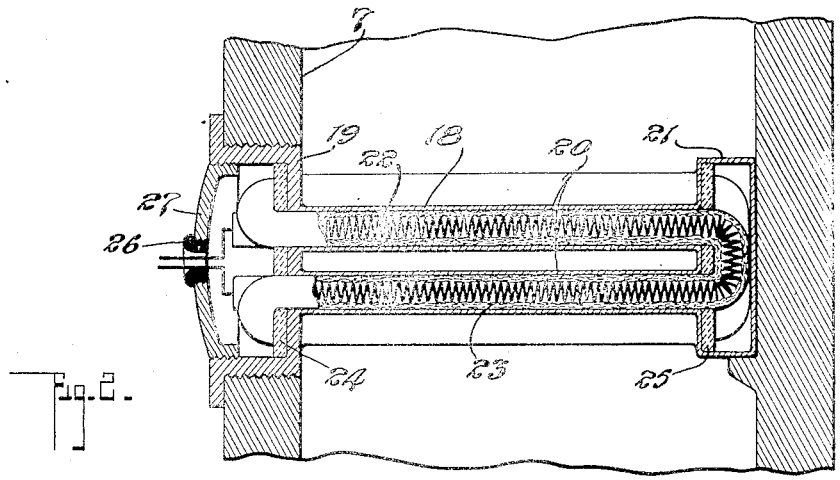
Witnesses
J. M. Sapley
Roland Miller
Inventor
R. R. Lockhart
By Fred B. ............ Atty

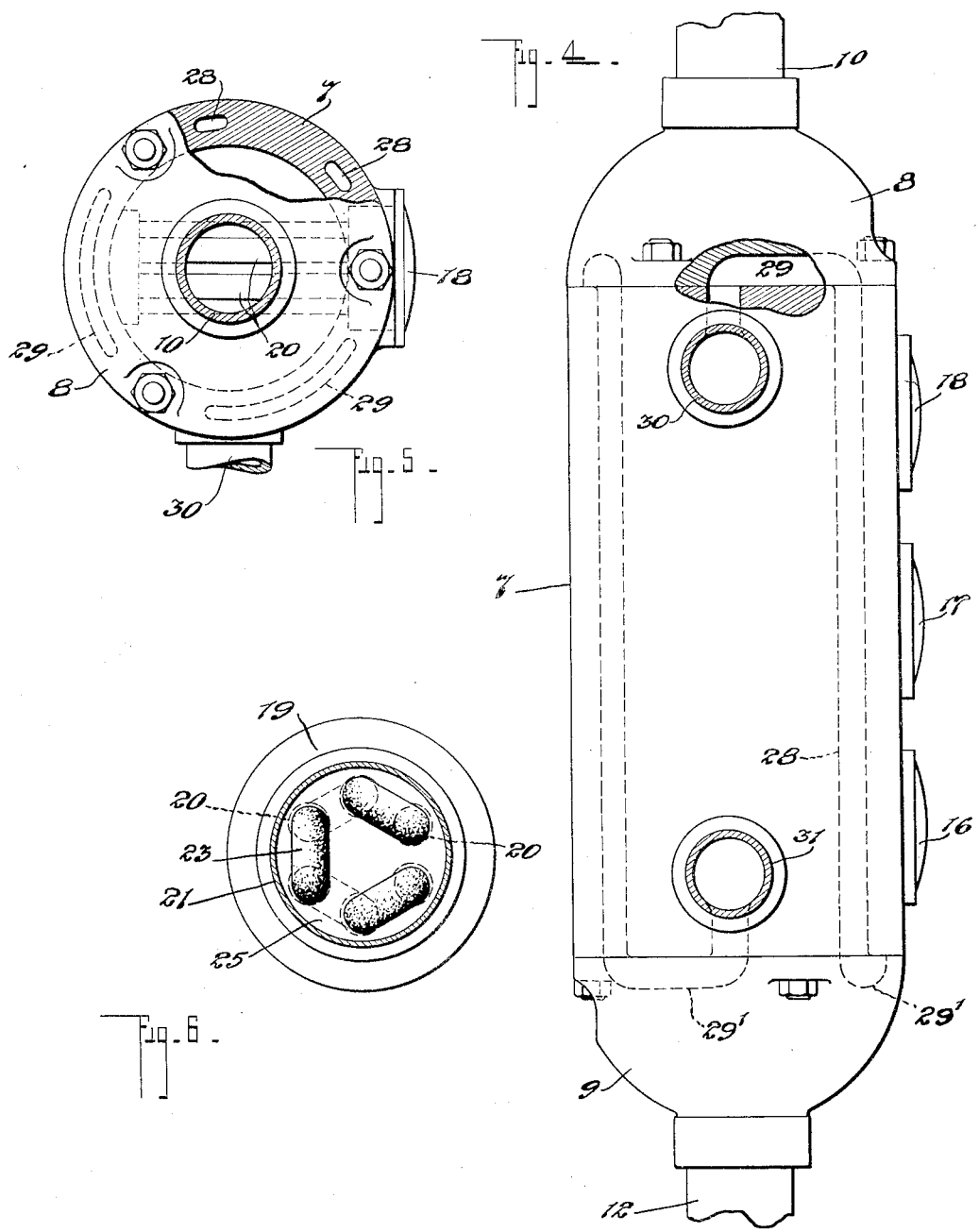

UNITED STATES PATENT OFFICE.

ROBERT ROY LOCKHART, OF WINNIPEG, MANITOBA, CANADA, ASSIGNOR TO HIMSELF, GEORGE A. GLINES, WILLIAM E. WRIGHT, VICTOR WILLIAMS, DANIEL BOYCE SPRAGUE, AND JOHN D. SINCLAIR, ALL OF WINNIPEG, MANITOBA, CANADA.

ELECTRICAL WATER-HEATER.

1,093,195.     Specification of Letters Patent.     Patented Apr. 14, 1914.

Application filed May 28, 1913. Serial No. 770,360.

*To all whom it may concern:*

Be it known that I, ROBERT ROY LOCKHART, of the city of Winnipeg, in the Province of Manitoba, Canada, have invented certain new and useful Improvements in Electrical Water-Heaters, of which the following is the specification.

The invention relates to an electrical water heater particularly adapted for hot water heating systems and the object of the invention is to provide an inexpensive and efficient electrical heater which can be readily installed in present hot water heating systems thereby dispensing with the usual coal or wood furnace.

A further object of the invention is to provide an electrical heater having a number of independently controlled heating elements whereby one can control the temperature of the water in the heating system by turning off or on one or more of the heating elements.

A still further object is to provide a heater which will not only heat the water of the heating system but will also supply a hot running water service for sinks, wash basins or bath tubs, this latter water being heated by the water of the heating system.

With the above objects in view the invention consists essentially in a cylindrical casing having the ends thereof closed by suitable head pieces and fitted with inlet and outlet feed pipes, and having further connected passages and ducts in the cylinder and heads and a series of independently controlled heating elements inserted within the casing, the parts being arranged and constructed as hereinafter more particularly described and later pointed out in the appended claims.

Figure 1 represents a side view of my device as applied in a heating system. Fig. 2 represents an enlarged detail longitudinal sectional view through one of the heating elements. Fig. 3 is a front view of one of the heating elements with the screw plug removed. Fig. 4 is an enlarged detailed side view of the water heater, parts being broken away to expose the construction. Fig. 5 is a plan view of the water heater, parts being broken away to expose the construction. Fig. 6 is a rear view of one of the heating elements, the casing being broken away.

In the drawings like characters of reference indicate corresponding parts in each figure.

In the present application I have shown my device as a substitute for the ordinary coal or wood furnace which is utilized as the heating element for a hot water heating system. In this case although the furnace is shown in the drawing it will be understood that it forms no part of the invention. It is simply inserted to show where and how my device is connected up in the present hot water heating systems having a furnace installed.

1 represents a furnace, 2 a water feed pipe passing to the furnace and 3 a water outlet pipe passing from the furnace, this latter pipe opening to the header 4 from which pass the distributing pipes 5. Where the furnace is used as the heating element the cooler water passes into the furnace through the pipe 2 where it is heated and passes out of the same through the pipe 3 where it is distributed to the various rooms to be heated.

In applying my invention the furnace is entirely dispensed with as the heating element and the electrical water heater 6 is installed between the pipes 2 and 3. This appliance is now described in detail.

7 represents a hollow cylindrical water container having the upper and lower ends closed by head pieces 8 and 9 which are permanently bolted to the ends of the cylinder. A pipe 10 leads from the head 8 to the pipe 3 which pipe is supplied with a globe or other such valve 11. A pipe 12 leads from the head 9 to the pipe 2 and is also supplied with a globe or such like valve 13.

Globe or other such like valves 14 and 15 are inserted in the pipes 2 and 3 immediately adjoining the furnace so that one can cut off the circulation through the furnace when my device is installed.

The container is supplied in the present instance with three heating elements 16, 17 and 18 all constructed as now described.

19 is a socket-shaped end piece screw threaded into the container 7 and carrying a series of similar spaced and parallel tubes 20 which extend across the container and support at their inner ends a closed cylindrical casing 21.

22 represents a resistance coil of wire passed through the tubes and insulated from the tubes by asbestos or other such material 23.

Fiber or other such like insulating disks 24 and 25 are located in the head piece and the casing respectively to effectively prevent any possibility of a short circuit at the ends where the coil is returned through the tubes. These disks can be entirely dispensed with where the asbestos can be relied upon to prevent short circuiting during continued use.

The ends of the coils are connected in each instance with supply wires which pass out through suitable insulating ferrules 26 located in a cap 27 screw threaded into the end piece. The wires passing from each heating element are in actual practice connected in suitable electrical circuits so that each element can be independently controlled.

The body of the container is cored out at suitable intervals to present vertically disposed passages 28 and the heads 8 and 9 are cast with cross ducts 29 and 29' respectively which ducts are arranged when the heads are applied on the container to connect the passages alternately at the top and bottom.

This construction provides a water heating coil in the walls of the heater, and the ends of the coil are opened to suitable inlet and outlet pipes 30 and 31 secured in any suitable way to the side of the heater. The pipe 31 admits cold water from any suitable source and the pipe 30 is utilized as the draw off pipe for the warm water passed to the taps located at such points as sinks, water basins and bath tubs.

When my electrical heater is installed the valves 14 and 15 are closed and the valves 11 and 13 are opened. Any one of the heating elements is then thrown into commission by turning on a suitably located switch inserted in the circuit containing any one of the coils 22. The water within the container can be heated to whatever temperature is desired by using one or more of the heating elements as will be readily understood. The coils 22 will heat the water in the container and in so doing establish a circulation through the pipes 2 and 3 and consequently throughout the water heating system. It will be seen that an effective heating area is provided as the water has to circulate between the tubes 20 containing the heating coils. As the water in the container becomes heated the walls of the container become heated and in so doing necessarily heat the water in the passages 28 formed in the body of said container. This water is utilized at the taps above described.

What I claim as my invention is:—

1. The combination comprising a cylindrical water container having the ends thereof closed by suitable heads supplied with inlet and outlet pipes, a plurality of socket shaped end pieces screw threaded into the sides of the container, a set of similar horizontally disposed and spaced tubes carried by each end piece and passing across the container, a hollow casing connecting the inner ends of the tubes of each set, a suitably insulated resistance coil threaded through the tubes of each set, said coil being threaded forwardly and backwardly through said tubes, caps screw threaded into the end pieces and inclosing the coil in each instance and feed wires communicating with each of the coils, said feed wires passing through suitably located insulating ferrules carried by the caps, as and for the purpose specified.

2. The combination with an open-ended cylindrical water container having a number of longitudinally disposed passage-ways in the walls thereof and a number of electrical heating elements contained within the container and passing through the wall thereof, of an inlet feed water pipe opening to one of said passage-ways, an outlet water pipe communicating with another of the passage-ways and heads closing the ends of the container and provided with facial ducts designed to connect alternately at the top and bottom the passage-ways, as and for the purpose specified.

Signed at Winnipeg this 30 day of April 1913.

ROBERT ROY LOCKHART.

In the presence of—
G. S. ROXBURGH,
ROLAND FOSTER.